US012779429B2

(12) United States Patent
Wu et al.

(10) Patent No.: US 12,779,429 B2
(45) Date of Patent: Nov. 3, 2026

(54) HUANGSHUI POLYSACCHARIDE-BASED HYDROGEL AND PREPARATION METHOD AND USE THEREOF

(71) Applicant: BEIJING TECHNOLOGY AND BUSINESS UNIVERSITY, Beijing (CN)

(72) Inventors: Jihong Wu, Beijing (CN); Ziyan Wu, Beijing (CN); Mingquan Huang, Beijing (CN); Baoguo Sun, Beijing (CN); Xiaotao Sun, Beijing (CN); Fuping Zheng, Beijing (CN); Jinyuan Sun, Beijing (CN); Hehe Li, Beijing (CN); Wei Dong, Beijing (CN); Nan Meng, Beijing (CN); Bowen Wang, Beijing (CN); Jiaying Huo, Beijing (CN)

(73) Assignee: BEIJING TECHNOLOGY AND BUSINESS UNIVERSITY, Beijing (CN)

( * ) Notice: Subject to any disclaimer, the term of this patent is extended or adjusted under 35 U.S.C. 154(b) by 386 days.

(21) Appl. No.: 18/568,864

(22) PCT Filed: Sep. 30, 2022

(86) PCT No.: PCT/CN2022/123118

§ 371 (c)(1),
(2) Date: Dec. 11, 2023

(87) PCT Pub. No.: WO2023/056893

PCT Pub. Date: Apr. 13, 2023

(65) Prior Publication Data

US 2024/0181426 A1 Jun. 6, 2024

(30) Foreign Application Priority Data

Oct. 8, 2021 (CN) .......................... 202111171336.0

(51) Int. Cl.
*B01J 20/24* (2006.01)
*B01J 20/28* (2006.01)
(Continued)

(52) U.S. Cl.
CPC ......... *B01J 20/24* (2013.01); *B01J 20/28009* (2013.01); *B01J 20/2803* (2013.01);
(Continued)

(58) Field of Classification Search
None
See application file for complete search history.

(56) References Cited

FOREIGN PATENT DOCUMENTS

| | | |
|---|---|---|
| CN | 1480224 A | 3/2004 |
| CN | 110156907 A | 8/2019 |

OTHER PUBLICATIONS

Wu et al. (International Journal of Biological Macromolecules, 2022, 216, 157-171). (Year: 2022).*

(Continued)

*Primary Examiner* — Clare M Perrin
(74) *Attorney, Agent, or Firm* — COOPER LEGAL GROUP LLC

(57) ABSTRACT

The present application relates to a hydrogel. The hydrogel includes polyvinyl alcohol, sodium carboxymethyl cellulose and Huangshui polysaccharide, and the mass ratio of the mass sum of the polyvinyl alcohol and the sodium carboxymethyl cellulose to the Huangshui polysaccharide is 100:(1.8-8.2). The present application further relates to use of the hydrogel as an adsorbent for a dye. The present application further relates to a method for preparing a hydrogel.

14 Claims, 14 Drawing Sheets

(51) Int. Cl.
*B01J 20/30* (2006.01)
*C02F 1/28* (2023.01)
*C02F 101/30* (2006.01)

(52) U.S. Cl.
CPC ..... *B01J 20/28047* (2013.01); *B01J 20/3042* (2013.01); *B01J 20/3071* (2013.01); *B01J 20/3085* (2013.01); *C02F 1/286* (2013.01); *C02F 2101/308* (2013.01)

(56) References Cited

OTHER PUBLICATIONS

Dai et al. (Carbohydrate Polymers, 2019, 209, 51-61). (Year: 2019).*
Huo et al. (Journal of Agricultural and Food Chemistry, 2022, 70, 711-735). (Year: 2022).*
Huo et al. (Food Resource International, 2020, 136, 109493). (Year: 2020).*
International Search Report of PCT Patent Application No. PCT/CN2022/123118 issued on Dec. 28, 2022.
Wu, Ziyan et al., Synthesis, characterization, and methylene blue adsorption of multiple-responsive hydrogels loaded with Huangshui polysaccharides, polyvinyl alcohol, and sodium carboxyl methyl cellulose, International Journal of Biological Macromolecules, Jul. 1, 2022, pp. 157-171, vol. 216.
Wang, Wenbing et al., Facile preparation of magnetic chitosan/poly(vinyl alcohol) hydrogel beads with excellent adsorption ability via freezing-thawing method, Colloids and Surfaces A: Physicochemical and Engineering Aspects, May 30, 2018, vol. 553.
Wang, Liangyi et al., Removal of Heavy Metal Ions by Poly(vinyl alcohol) and Carboxymethyl Cellulose Composite Hydrogels Prepared by a Freeze-Thaw Method, ACS Sustainable Chemistry & Engineering, Apr. 14, 2016, vol. 4, No. 5.
Dai, Hongjie et al., Green pH/magnetic sensitive hydrogels based on pineapple peel cellulose and polyvinyl alcohol: Synthesis, characterization and naringin prolonged release, Carbohydrate Polymers, Jan. 6, 2019, pp. 51-61, vol. 209.

* cited by examiner

HUANGSHUI POLYSACCHARIDE-BASED HYDROGEL AND PREPARATION METHOD AND USE THEREOF

RELATED APPLICATIONS

The present application claims the priority of a Chinese patent application No. 2021111713360, titled "HUANGSHUI POLYSACCHARIDE-BASED HYDROGEL AND PREPARATION METHOD AND USE THEREOF" filed on Oct. 8, 2021, the entire contents of which are incorporated herein by reference.

TECHNICAL FIELD

The present application relates to the technical field of hydrogels, and specifically relates to a Huangshui polysaccharide-based hydrogel and a preparation method and use thereof.

BACKGROUND

Dye wastewater pollution, represented by methylene blue, is a serious environmental problem at present. The methylene blue, with a chemical formula of $C_{16}H_{18}N_3ClS$, is a phenothiazine salt, which has been widely used in chemical indicators, dyes, biological dyes, drugs and other aspects. The methylene blue is a dark green bronze luster crystal or powder that is soluble in water and ethanol and insoluble in ethers. The methylene blue is stable in air, and an aqueous solution of the methylene blue is alkaline and toxic. A high-concentration (5-10 mg/kg; 1% solution 25-50 mL) methylene blue solution has an oxidization effect on hemoglobin, so that methemoglobin is produced. The reason is that when a large amount of the product enters the body, the production of reduced coenzyme I dehydrogenase (NADPH) is reduced, the product cannot be completely converted into reduced methylene blue, a large amount of oxidized methylene blue is produced, and the hemoglobin is oxidized into the methemoglobin.

Traditional treatment methods for the methylene blue include the following types. For example, a chemical method includes adding tannic acid and metallic calcium ions into methylene blue wastewater, performing mixing and adding a flocculant for precipitation. However, a new polluting compound is introduced during treatment of wastewater by the method. A method for preparing a phosphoric acid modified peanut shell to adsorb methylene blue is provided. However, the method is dependent on natural plant resources and has the problems of insufficient raw materials, high cost and poor stability.

SUMMARY

Based on the above situations, aiming at the problems of traditional treatment methods for dye wastewater, a Huangshui polysaccharide-based hydrogel with high safety, low cost and high stability and a preparation method and use thereof are required to be provided, so as to realize optimized treatment of dye wastewater.

The present application is implemented as follows.

In a first aspect, the present application provides a hydrogel. The hydrogel includes polyvinyl alcohol, sodium carboxymethyl cellulose and Huangshui polysaccharide, and the mass ratio of the mass sum of the polyvinyl alcohol and the sodium carboxymethyl cellulose to the Huangshui polysaccharide is 100:(1.8-8.2).

In some embodiments, the mass ratio of the mass sum of the polyvinyl alcohol and the sodium carboxymethyl cellulose to the Huangshui polysaccharide is 100:(1.8-2.2).

In some embodiments, the mass ratio of the polyvinyl alcohol to the sodium carboxymethyl cellulose is (2.8-3.2):(1.8-2.2).

In some embodiments, the polyvinyl alcohol, the sodium carboxymethyl cellulose and the Huangshui polysaccharide are connected by intermolecular and/or intramolecular hydrogen bonds, and the hydrogel has a porous structure.

In some embodiments, the Huangshui polysaccharide is selected from brewing Huangshui polysaccharide.

In some embodiments, the hydrogel further includes magnetic particles doped in a hydrogel matrix.

In a second aspect, the present application provides use of the hydrogel as an adsorbent for a dye.

In some embodiments, the dye is selected from methylene blue.

In some embodiments, the hydrogel as an adsorbent for a dye has an operating pH value of 2-10 and an operating temperature of 25-65° C.

In a third aspect, the present application provides a method for preparing the hydrogel. The method includes the following steps:

a, swelling polyvinyl alcohol in water;

b, mixing a swelled polyvinyl alcohol solution with sodium carboxymethyl cellulose to obtain a first mixture, and heating and stirring the first mixture;

c, cooling the heated and stirred first mixture;

d, mixing the cooled first mixture with Huangshui polysaccharide to obtain a second mixture; and e, subjecting the second mixture to freezing and thawing in cycles.

In some embodiments, a swelling process in step a includes steps of heating and stirring, the heating is performed at a temperature of 55-65° C., and the stirring is performed for 30-60 min.

In some embodiments, in step b, the heating is performed at a temperature of 88-98° C., and the stirring is performed for 50-70 min. In some embodiments, the cooling in step c is performed to a temperature of 20-30° C.

In some embodiments, the step of mixing in step d includes dropping a Huangshui polysaccharide solution into the first mixture.

In some embodiments, in step e, the freezing is performed at a temperature of −20° C. to −15° C., the thawing is performed at a temperature of 25-30° C., the freezing is performed for 7-9 h each time, the thawing is performed for 4-6 h each time, and the freezing and the thawing are performed in 5-8 cycles.

In some embodiments, step c further includes a step of stirring after the cooling, and the stirring is performed for 20-40 min.

In some embodiments, step d further includes a step of stirring the second mixture, and the stirring is performed for 20-40 min.

In some embodiments, the method further includes sequentially immersing a gel-like product obtained in step e in solutions added with iron ions, hydroxide ions and magnetic particles to carry out a reaction;

optionally, the iron ions are a mixture of $Fe^{2+}$ and $Fe^{3+}$, the concentration ratio of the $Fe^{2+}$ to the $Fe^{3+}$ is (0.8-1.2):2, the immersing time is 3-5 h, the concentration of the hydroxide ions is 1.8-2.2 mol/L, and the immersing time is 3-5 h;

and optionally, the method further includes a step of washing a reaction product to neutral.

In some embodiments, an extraction step of the Huangshui polysaccharide includes: sequentially subjecting brewing Huangshui to centrifugation, ultrafiltration, alcohol precipitation treatment and centrifugation, collecting a precipitate, and drying the precipitate;

and optionally, in the extraction step, conditions for the first centrifugation include that the centrifugation is performed at a temperature of 0-4° C. and a centrifugal force of 4,000-6,000 g for 15-30 min, and conditions for the second and subsequent centrifugation include that the centrifugation is performed at a temperature of 0-4° C. and a centrifugal force of 8,000-10,000 g for 5-25 min.

BRIEF DESCRIPTION OF FIGURES

In order to describe technical schemes in embodiments of the present application or in the prior art more clearly, attached drawings required for use in description of the embodiments or the prior art are briefly introduced below. Obviously, the attached drawings described below are only embodiments of the present application, and for persons of ordinary skill in the art, other drawings can also be obtained without creative effort based on the disclosed drawings.

DETAILED DESCRIPTION

Figure 1:
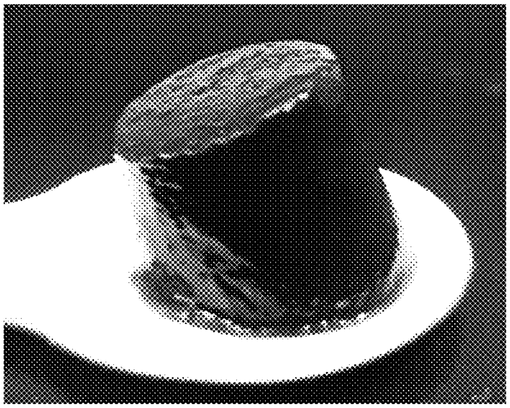
FIG. 1 is a photograph of a hydrogel added with magnetic particles ($Fe_3O_4$) in an embodiment of the present application.

The technical schemes in the embodiments of the present application are clearly and completely described below in combination with the drawings attached to the embodiments of the present application. Obviously, the embodiments described are only a part of the embodiments of the present application, rather than all of the embodiments. Based on the embodiments of the present application, all other embodiments obtained by persons of ordinary skill in the art without creative effort fall within the scope of protection of the present application.

Except as indicated or otherwise indicated in operational embodiments, all figures used for indicating amounts of components, physical and chemical properties and the like in the specification and claims are understood to be adjusted by the term “about” in all cases. Therefore, unless stated to the contrary, numerical parameters listed in the specification and attached claims are approximate values, and the approximate values may be appropriately changed by persons skilled in the art according to required characteristics sought and obtained by means of teaching contents disclosed herein. The use of a numeric range represented by endpoints includes all numbers in the range and any ranges in the range. For example, the range of 1-5 includes 1, 1.1, 1.3, 1.5, 2, 2.75, 3, 3.80, 4, 5 and the like.

Huangshui polysaccharide is crude polysaccharide extracted from Huangshui.

During brewing and production of Baijiu (Chinese liquor), starch and sugars in raw materials are used for alcohol fermentation, and other components are rarely used. Vitamins, phenols and other compounds contained in brewing raw materials, such as sorghum, rice, corn, glutinous rice and wheat, as well as small molecule peptides, amino acids and other compounds produced during fermentation and metabolism have antioxidant activities. These substances are dissolved in a water environment of fermented grains and gradually deposited at the bottom of a pit. After the fermentation is completed, liquid produced by fermentation and metabolism of the fermented grains for a long time and liquid obtained by sedimentation and collection of moisture of the fermented grains at the bottom are mixed to obtain traditional brewing Huangshui. The Huangshui generally contains 1-2% of residual starch, 0.3-0.7% of residual sugar, 4-5% of ethanol, organic acids, precursor substances with a liquor flavor and abundant antioxidant active substances, and has a high use value. The Huangshui is a fermentation product obtained in a brewing process in a pit.

In a first aspect, the present application provides a hydrogel. The hydrogel includes polyvinyl alcohol, sodium carboxymethyl cellulose and Huangshui polysaccharide, and the mass ratio of the mass sum of the polyvinyl alcohol and the sodium carboxymethyl cellulose to the Huangshui polysaccharide is 100:(1.8-8.2).

The present application provides a scheme of using a hydrogel to treat dye wastewater. A hydrogel prepared from Huangshui polysaccharide, polyvinyl alcohol and sodium carboxymethyl cellulose is used to adsorb methylene blue and other dyes in wastewater. The hydrogel not only has a strong swelling property, a larger adsorption surface area and a large adsorption capacity, but also has a low price, so that application and popularization are facilitated. Moreover, it has been found through research that the adsorption property and swelling property of the hydrogel can be obviously improved by adding the Huangshui polysaccharide.

In some embodiments, the mass ratio of the mass sum of the polyvinyl alcohol and the sodium carboxymethyl cellulose to the Huangshui polysaccharide may be 100:2, 100:3, 100:4, 100:5, 100:6, 100:7 and 100:8.

In some embodiments, the mass ratio of the mass sum of the polyvinyl alcohol and the sodium carboxymethyl cellulose to the Huangshui polysaccharide is 100:(1.8-2.2).

In some embodiments, the mass ratio of the polyvinyl alcohol to the sodium carboxymethyl cellulose is (2.8-3.2):(1.8-2.2).

In some embodiments, the polyvinyl alcohol, the sodium carboxymethyl cellulose and the Huangshui polysaccharide are connected by intermolecular and/or intramolecular hydrogen bonds.

In some embodiments, the Huangshui polysaccharide is selected from polysaccharides extracted from Huangshui, a fermentation product of liquor.

In some embodiments, the Huangshui polysaccharide is selected from a fermentation product of liquor. For example, the liquor is selected from any one or more of Luzhou-flavor liquor, Maotai-flavour liquor and Fen-flavor liquor. The liquor may be Wuliangye and the like.

In some embodiments, the hydrogel further includes magnetic particles doped in a hydrogel matrix. The magnetic particles and other components of the hydrogel are physically crosslinked under the interaction of hydrogen bonds to form a magnetic hydrogel with an interpenetrating network structure.

Optionally, the magnetic particles are selected from any one or two of $Fe_2O_3$ and $Fe_3O_4$.

In some embodiments, the hydrogel has a porous structure.

In a second aspect, the present application further provides use of the hydrogel as an adsorbent for a dye.

Optionally, the dye is selected from methylene blue.

In some embodiments, the hydrogel as an adsorbent for a dye has an operating pH value of 2-10. Specifically, the operating pH value may be 2, 3, 4, 5, 6, 7, 8, 9 or 10.

In some embodiments, the hydrogel as an adsorbent for a dye has an operating temperature of 25-65° C. Specifically, the operating temperature may be 25° C., 30° C., 35° C., 40° C., 45° C., 50° C., 55° C., 60° C. or 65° C.

In a third aspect, the present application further provides a method for preparing the hydrogel. The method includes the following steps:

a, swelling polyvinyl alcohol in water;

b, mixing a swelled polyvinyl alcohol solution with sodium carboxymethyl cellulose to obtain a first mixture, and heating and stirring the first mixture;

c, cooling the heated and stirred first mixture;

d, mixing the cooled first mixture with Huangshui polysaccharide to obtain a second mixture; and e, subjecting the second mixture to freezing and thawing in cycles.

In some embodiments, a swelling process in step a includes steps of heating and stirring, the heating is performed at a temperature of 55-65° C., and the stirring is performed for 30-60 min.

In some embodiments, in step b, the heating is performed at a temperature of 88-98° C., and the stirring is performed for 50-70 min.

In some embodiments, the cooling in step c is performed to a temperature of 20-30° C.

In some embodiments, the method further includes a step of stirring after the cooling, and the stirring is performed for 20-40 min.

In some embodiments, the step of mixing in step d includes dropping a Huangshui polysaccharide solution into the first mixture.

In some embodiments, the method further includes a step of stirring the second mixture, and the stirring is performed for 20-40 min.

In some embodiments, an extraction step of the Huangshui polysaccharide includes: sequentially subjecting brewing Huangshui to centrifugation, ultrafiltration, alcohol precipitation treatment and centrifugation, collecting a precipitate, and drying the precipitate. In some embodiments, in the extraction step, conditions for the first centrifugation include that the centrifugation is performed at a temperature of 0-4° C. and a centrifugal force of 4,000-6,000 g for 15-30 min, and conditions for the second and subsequent centrifugation include that the centrifugation is performed at a temperature of 0-4° C. and a centrifugal force of 8,000-10,000 g for 5-25 min.

In some embodiments, in step e, the freezing is performed at a temperature of −20° C. to −15° C., the thawing is performed at a temperature of 25-30° C., the freezing is performed for 7-9 h each time, the thawing is performed for 4-6 h each time, and the freezing and the thawing are performed in 5-8 cycles.

In some embodiments, the preparation method further includes sequentially immersing a gel-like product obtained in step e in solutions added with iron ions, hydroxide ions and magnetic particles to carry out a reaction.

The hydroxide ions may be provided by alkali metal salts, such as sodium hydroxide and potassium hydroxide.

Optionally, the iron ions are a mixture of $Fe^{2+}$ and $Fe^{3+}$, the concentration ratio of the $Fe^{2+}$ to the $Fe^{3+}$ is (0.8-1.2):2, the immersing time is 3-5 h, the concentration of the hydroxide ions is 1.8-2.2 mol/L, and the immersing time is 3-5 h.

Optionally, step e further includes a step of washing a reaction product to neutral.

Specific embodiments are provided below.

Example 1

1. Materials and Methods 1.1. Materials and Reagents

Wuliangye Huangshui polysaccharide (WHSP), polyvinyl alcohol (PVA), sodium carboxymethyl cellulose (CMC) and cellulose (NC) were used.

1.2. Instruments and apparatuses

| Instrument name | Model | Manufacturer |
|---|---|---|
| Fourier transform infrared spectrometer | iS10 FT-IR spectrometer | Thermo Nicolet Corporation |
| X-ray diffractometer | D8 ADVANCE | Bruker of Germany |
| Thermal field emission scanning electron microscope | Gemini300 | Carl Zeiss AG of Germany |
| DSC instrument | TA Q200 | TA of the United States |
| Synchronous thermal analyzer | STA449F5 | Netzsch of Germany |
| Differential scanning calorimeter | TG-DSC 3+ | Mettler |
| Texture profile analyzer | TA.XTC-18 | BosinTech |
| Vibrating sample magnetometer | SQUID-VSM, MPMS-3 | Quantum Design of the United States |
| Multifunctional microplate reader | SpectraMax.M2e | Molecular.Devices of the United States |

1.3. Method for Preparing a Hydrogel (1) 1.5 g of polyvinyl alcohol (PVA with an average polymerization degree of 1,750±50) was added into 100 g of distilled water, heated to 60° C., and stirred for 30 min to enable the PVA completely swelled.
(2) When the PVA was completely turned greyish white and fully swelled, 1.0 g of sodium carboxymethyl cellulose (CMC) (with a viscosity of 800-1,200) was added, heated to 96° C., stirred for 1 h, and then stirred at normal temperature for 30 min.
(3) After the PVA and the CMC were uniformly mixed, 50 mL of WSHP or NC (three groups including 2%-0.05 g, 4%-0.1 g and 8%-0.2 g) was dropped at room temperature, stirred for 30 min, subjected to ultrasonic treatment and standing at 4° C. for 12 h to remove bubbles, and then poured into a cylindrical mold.
(4) A mixture was subjected to freezing at −20° C. for 8 h and thawing at room temperature for 4 h in five freezing-thawing cycles to obtain a PVA/CMC/polysaccharide hydrogel.
(5) The hydrogel obtained in step (4) was first immersed in a mixed solution of 0.1 mol/L $Fe^{2+}$ and 0.2 mol/L $Fe^{3+}$ for 4 h, and then immersed in a 2 mol/L NaOH solution for 4 h to obtain a magnetic hydrogel m-PVA/CMC/WSHP.
(6) The hydrogel m-PVA/CMC/WSHP was soaked in distilled water for 72 h, the water was changed every 6 h, and then the hydrogel was wash to neutral. A photograph of the hydrogel is shown in FIG. 1.

2. Structural Characterization 2.1. Infrared Spectrum (FTIR) Characterization 2 mg of a dried sample was selected for analysis and determination in an angle to reflection (ATR) mode. The wavenumber range was 400-4,000 $cm^{-1}$, the resolution of a spectrometer was 4 $cm^{-1}$, the signal-to-noise ratio was 50,000:1, and scanning was performed for 64 times.

2.2. X-Ray Diffraction (XRD) Characterization

A dried sample was ground into a powder, and an XRD test was carried out by an X-ray diffractometer under the following test conditions: a Ni filter, a Cu target, a diffusion angle (2θ) of 2-50°, a scanning rate set at 2/min, and a tube pressure and a tube flow set at 40 kV and 40 mA, respectively.

2.3. Analysis of Magnetic Properties

A hysteresis loop of a freeze-dried magnetic hydrogel powder was measured at 300 K by a vibrating sample magnetometer (SQUID-VSM, MPS-3, the United States) in a magnetic field range of ±3 T.

2.4. Observation With a Scanning Electron Microscope (SEM)

Small amounts of a dried unground hydrogel sample and Wuliangye Huangshui polysaccharide were separately fixed to a copper plate with a conductive adhesive. Then, a surface of the sample was subjected to gold spraying treatment. The surface morphology of the sample was observed by a scanning electron microscope at an acceleration voltage of 10 kV.

2.5. Texture Profile Analysis

Referring to a Hurler method as experimental conditions of texture profile analysis (TPA), a polysaccharide hydrogel sample was adjusted to have a diameter of about 2 cm and a height of about 10 mm. The sample was compressed once by a cylindrical stainless steel probe (P5: 5 mm DIACYL in Der Stainless) at a force of 5 g, a compression amount of 30% of the original height of the sample, a pre-compression velocity of 5 mm/s, a compression velocity of 1 mm/s, and an after-compression velocity of 5 mm/s. A texture profile analysis test was repeated for 3 times for each sample. TPA parameters include hardness, springiness, chewiness, cohesiveness, fracturability, gumminess, resilience and the like.

2.6. Thermal Stability Analysis (TG-DSC)

An appropriate amount of a dried sample was selected, and a TG curve and a DSC curve of the sample were determined by a TG-DSC synchronous thermal analyzer under the following conditions that the temperature was raised from room temperature to 600° C. at a rate of 10° C./min in an $N_2$ atmosphere.

2.7. Swelling Property Analysis 50 mg of a dried hydrogel was completely soaked in distilled water at room temperature. The mass of the hydrogel was recorded immediately after an excess amount of water on the surface was removed at a preset time interval. The swelling capacity at a specific time may be calculated using a formula.

$$\text{Swelling ratio: } (g/g) = (W_t - W_d)/W_d$$

where $W_t$ (g) and $W_d$ (g) refer to the weight of a swelled hydrogel at time t (min) and the weight of a dry hydrogel, respectively.

2.8. pH Response Analysis

The pH sensitivity of a hydrogel was determined by monitoring changes in the swelling capacity in solutions with different pH values (pH 2.0-12.0). After swelling equilibrium was reached at room temperature, the swelling capacity was recorded based on the swelling ratio.

2.9. Determination of an Adsorption Property of a Hydrogel for Methylene Blue 2.9.1. Adsorption of methylene blue by a hydrogel at different temperatures and different pH values 20 mg of a dried hydrogel was immersed in 15 mL of a 100 mg/L methylene blue aqueous solution to carry out static adsorption at different temperatures and at different pH values at normal temperature. 0.1 mL of the solution (correspondingly added with 0.1 mL of distilled water) was sucked at an interval, diluted and then measured by a multifunctional microplate reader to obtain an absorption value at 664 nm. The adsorption capacity Q (mg/g) of the hydrogel for methylene blue was calculated according to a standard curve:

$$Q_t = \frac{(C_0 - C_t)V}{m}.$$

In the formula, $Q_t$ (mg/g) refers to the adsorption capacity of the hydrogel at different times; $C_o$ and $C_t$ (mg/L) refer to the initial concentration of the methylene blue solution and the concentration after adsorption for a certain period of time, respectively; V (L) refers to the volume of the methylene blue solution; and m (g) refers to the mass of the dried hydrogel.

2.9.2. Adsorption Kinetics of a Hydrogel for Methylene Blue

Kinetics of an adsorption process was evaluated by a pseudo-first order kinetic model and a pseudo-second order kinetic model. In addition, a diffusion model of the adsorption process was predicted by an adsorbent internal diffusion equation Weber. In an adsorption experiment, kinetic parameters are important mechanical parameters for predicting the adsorption rate and the equilibrium time. Calculation formulas of pseudo-first order kinetics, pseudo-second order kinetics and the Weber equation are shown as Formulas (1), (2) and (3).

$$\ln^{(Q_e - Q_t)} = \ln^{Q_e} - k_1 t \quad (1)$$

$$\frac{t}{Q_t} = \frac{1}{k_2 Q_e^2} + \frac{t}{Q_e} \quad (2)$$

$$Q_t = k_p t^{\frac{1}{2}} \quad (3)$$

In the formulas: $Q_t$ (mg/g) and $Q_e$ (mg/g) refer to the adsorption capacity at the time t (min) and the adsorption capacity at adsorption equilibrium, respectively; $k_1$ and $k_2$ refer to coefficients of a pseudo-first order kinetic model and a pseudo-second order kinetic model for adsorption, respectively; and $k_p$ ($mg(g{\cdot}min^{1/2})^{-1}$) refers to a particle internal diffusion rate constant.

3. Results and Discussions

Figure 2:
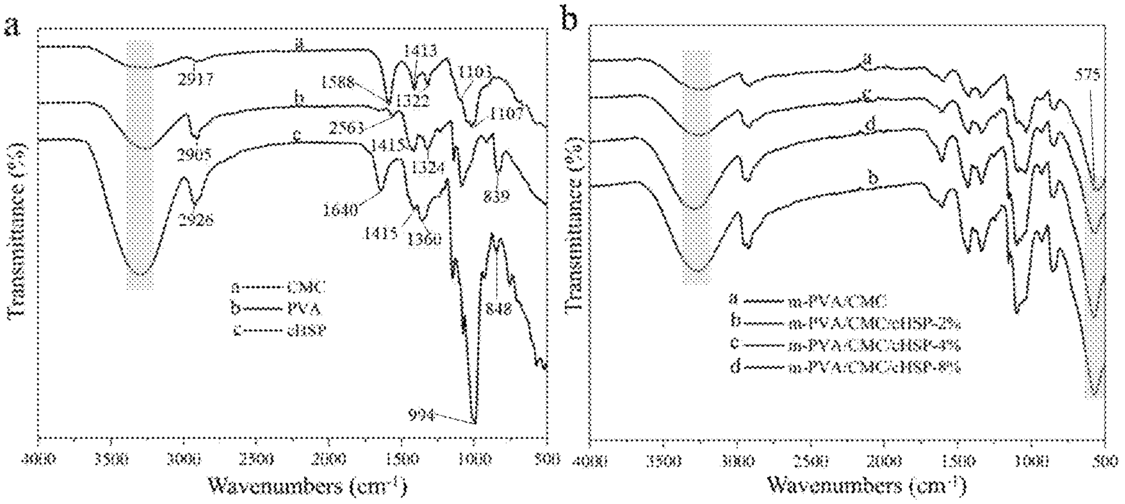
FIG. 2 shows infrared spectra of hydrogel materials and hydrogels in an embodiment of the present application, in which a of FIG. 2 shows infrared spectra of sodium carboxymethyl cellulose (CMC), polyvinyl alcohol (PVA) and Wuliangye Huangshui polysaccharide (WHSP), and b of FIG. 2 shows infrared spectra of m-PVA/CMC, m-PVA/CMC/WHSP-2%, m-PVA/CMC/WHSP-4% and m-PVA/CMC/WHSP-8%.

3.1. FTIR Infrared Analysis a of FIG. 2 shows initial materials for preparing a hydrogel. As shown in b of FIG. 2, as for polyvinyl alcohol, a wide peak at 3263 $cm^{-1}$ is related to tensile vibration of O—H. A peak at 1562.75 $cm^{-1}$ corresponds to tension of C—O of a carboxyl group. Peaks at 2905 $cm^{-1}$, 1563 $cm^{-1}$, 1415 $cm^{-1}$ and 1324 $cm^{-1}$ are related to tensile vibration of C—H and C—O—C and bending vibration of C—H, respectively. A peak at 1142 $cm^{-1}$ is generated by stretching vibration of C—C—C. A peak at 839 $cm^{-1}$ is generated by stretching vibration of end vinyl and C═C. As for CMC, highly strong peaks at 1588 $cm^{-1}$ and 1413 $cm^{-1}$ are considered as being generated by tensile vibration of a —COO group and salts thereof, which correspond to characteristic absorption of carboxymethyl cellulose. A peak at 1322 $cm^{-1}$ is considered as an asymmetric stretching vibration absorption peak of —C═O. A peak at 1017.30 $cm^{-1}$ corresponds to tensile vibration of a pyramidal ring of C—O—C. As for WHSP, a peak at 3304 $cm^{-1}$ is a stretching vibration absorption peak of OH, a peak at 2926 $cm^{-1}$ is an absorption peak of C—H, and absorption peaks in this region are characteristic peaks of sugars. An absorption peak at 1640 $cm^{-1}$ is caused by stretching vibration of a carboxyl group (COO—), and an absorption peak at 1360 $cm^{-1}$ is caused by variable angle vibration of C—H. A peat at 994 $cm^{-1}$ is caused by rolling vibration of methenyl at an end of a pyran ring. As shown in b of FIG. 2, compared with the initial materials (PVA, CMC and WHSP), all hydrogels have new characteristic absorption peaks caused by Fe—O lattice vibration of $Fe_3O_4$ at 575 $cm^{-1}$, indicating that the $Fe_3O_4$ is successfully doped. A wide peak at 3300 $cm^{-1}$ is caused by the interaction between intermolecular and intramolecular hydrogen bonds of O—H groups in PVA, CMC and WHSP. Compared with m-PVA/CMC, hydrogels doped with WHSP have relatively improved O—H group intensity, further indicating that the PVA, the CMC and the WHSP are connected by hydrogen bonds. As no new chemical bonds are produced between these compounds, a hydrogel is formed by physical cross-linking under the interaction between hydrogen bonds, and the hydrogel has an interpenetrating network structure.

3.2. XRD Analysis

Figure 3:
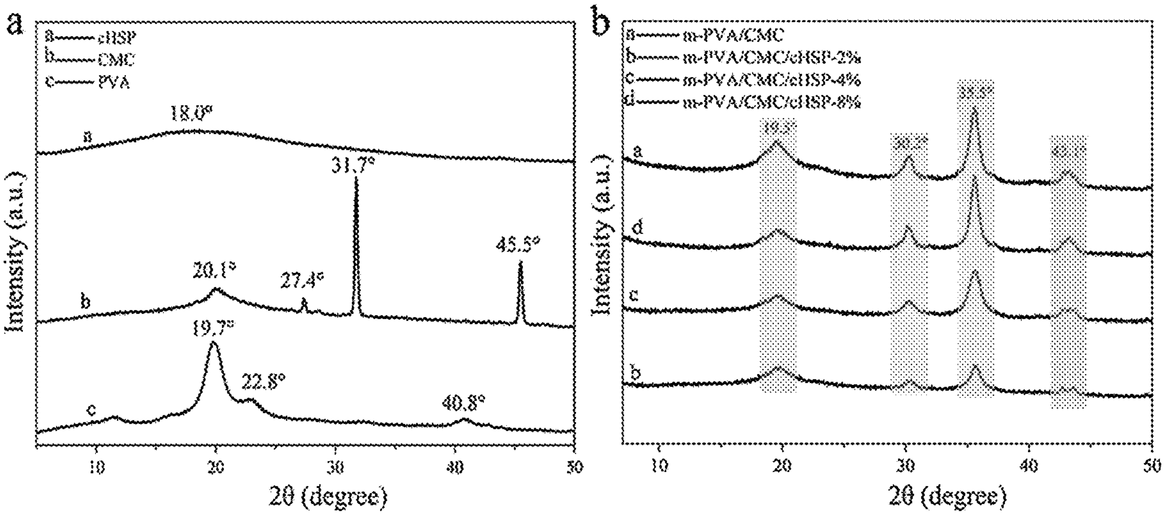
FIG. 3 shows X-ray diffraction (XRD) energy spectra of hydrogel materials and hydrogels in an embodiment of the present application, in which a of FIG. 3 shows XRD energy spectra of WHSP, CMC and PVA, and b of FIG. 3 shows XRD energy spectra of m-PVA/CMC, m-PVA/CMC/WHSP-2%, m-PVA/CMC/WHSP-4% and m-PVA/CMC/WHSP-8%.

XRD patterns of the initial materials and magnetic hydrogels are shown in a of FIG. 3 and b of FIG. 3. The PVA usually has a strong peak at a 2θ value of 19.7°, a shoulder peak at a 2θ value of 22.8° and a weak peak at a 2θ value of 40.8°, which are characteristic crystal peaks of the PVA. The WHSP has a wide peak only at a 2θ value of 18°, indicating that the WHSP has low crystallinity and no obvious characteristic diffraction peaks. Diffraction peaks of the CMC are compared with a standard PDF card (JCPDS no. 05-0628), in which peaks at 27.4°, 31.7° and 45.5° correspond to crystal surfaces (111), (220) and (222) of sodium chloride, respectively. The NaCl has diffraction peaks because the element chlorine is introduced in a preparation process of the CMC and a trace amount of $Cl^-$ is remained. Cellulose II has a characteristic crystal diffraction peak at a 2θ value of 20.1°. $Fe_3O_4$ has three characteristic peaks at a 2θ value of 30.2°, 35.5° and 43.1°, which correspond to crystal surfaces (220), (311) and (400) of pure $Fe_3O_4$ with a spinel structure, respectively. It is found in b of FIG. 3 that all the hydrogels have similar diffraction patterns, and peaks related to crystal surface of $Fe_3O_4$ are observed, proving that the $Fe_3O_4$ is successfully doped in the hydrogels. A weak and wide peak occurs at a 2θ value of 19° because the polyvinyl alcohol structurally has intermolecular and intramolecular hydrogen bonds, and decrease of the peak intensity may be caused by inhibited crystallization of the PVA under the interaction between —OH of a side chain of the PVA and —OH of the CMC.

3.3. Analysis of Magnetic Properties of Hydrogels

Figure 4:
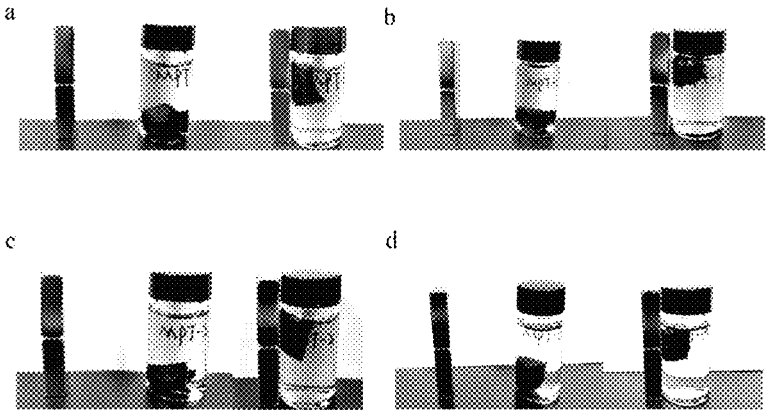
FIG. 4 shows a magnetic experiment of hydrogels in an embodiment of the present application.
Figure 5:
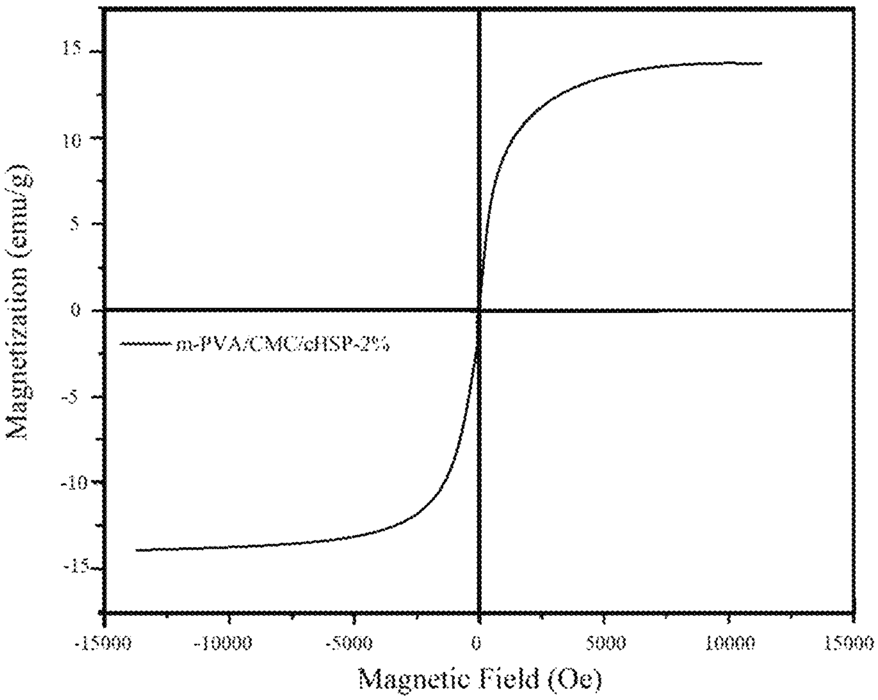
FIG. 5 shows a hysteresis loop of a hydrogel in an embodiment of the present application.

According to the FTIR and XRD analysis, ferroferric oxide is successfully embedded in hydrogels. As shown in FIG. 4, all prepared hydrogels including m-PVA/CMC, m-PVA/PCMC/WHSP-2%, m-PVA/PCMC/WHSP-4% and m-PVA/PCMC/WHSP-8% have magnetic properties. Magnetic response behaviors of the hydrogel m-PVA/PCMC/WHSP-2% are further determined by analyzing a magnetization curve. A hysteresis loop is shown in FIG. 5. The S-shaped hysteresis loop is symmetric with an origin, and the hydrogel has no hysteresis, coercivity and remanence, indicating that the hydrogel has superparamagnetism. The m-PVA/PCMC/WHSP-2% has a saturation magnetization of 14.81 emu/g, which is sufficient for magnetic separation from a solution of an applied magnet. As shown in FIG. 4, after magnets are placed close to glass containers, the hydrogels gather to the sides, close to the magnets, of the glass containers.

3.4. SEM Analysis

Figure 6:
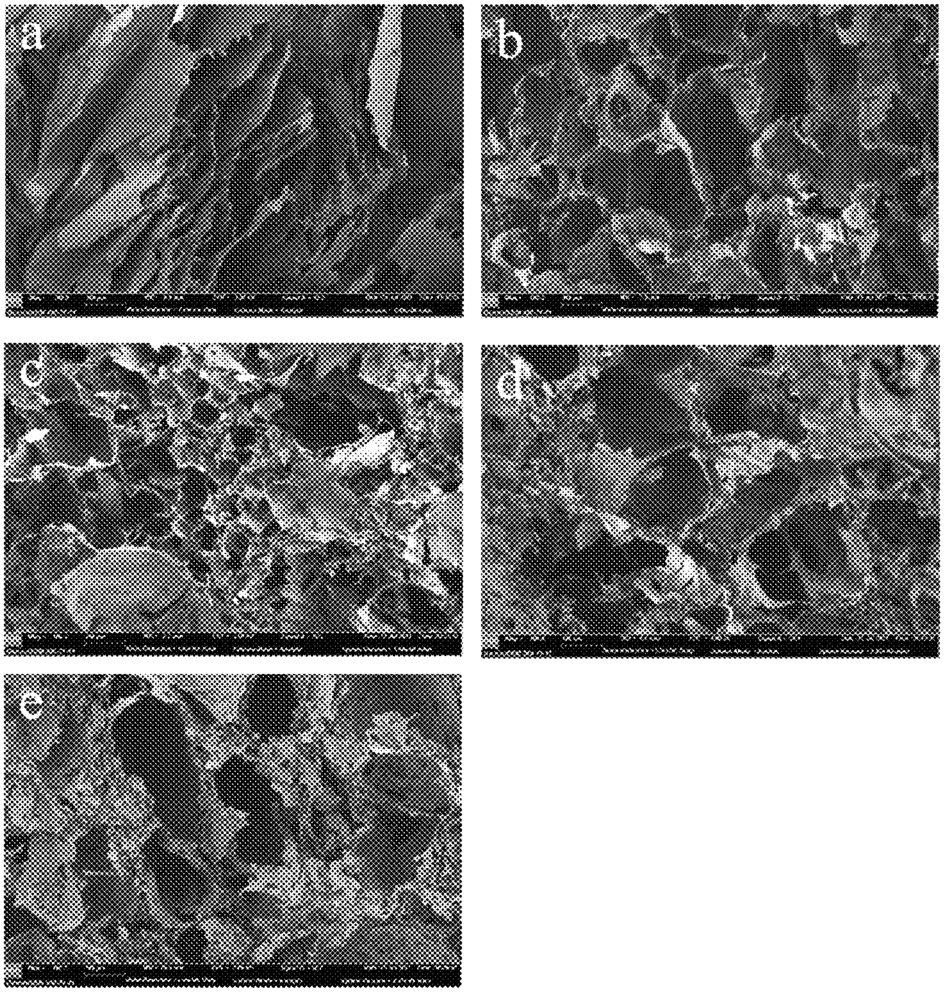
FIG. 6 shows scanning electron microscope (SEM) analysis of hydrogels in an embodiment of the present application, in which a of FIG. 6 refers to WHSP, b of FIG. 6 refers to m-PVA/CMC, c of FIG. 6 refers to m-PVA/CMC/WHSP-2%, d of FIG. 6 refers to m-PVA/CMC/WHSP-4%, and e of FIG. 6 refers to m-PVA/CMC/WHSP-8%.

As the WHSP has a lamellar distribution, all hydrogels formed with the PVA and the CMC have an interconnected pore structure, and organic-inorganic phases are almost indistinguishable. The hydrogels have good surface uniformity and no aggregation of free polysaccharides or $Fe_3O_4$, indicating that components of the polyvinyl alcohol, the CMC, the WHSP and the $Fe_3O_4$ have ideal compatibility. With increase of the added amount of the WHSP, the hydrogel has a more orderly and fluffy porous structure. A rich hydroxyl group in the WHSP can induce the formation of more hydrogen bonds between the polyvinyl alcohol, the CMC and the WHSP, resulting in a more fluffy porous structure inside. As can be seen from FIG. 6 (WHSP (a), m-PVA/CMC (b), m-PVA/CMC/WHSP-2% (c), m-PVA/CMC/WHSP-4% (d) and m-PVA/CMC/WHSP-8% (e)), compared with other two added amounts, the hydrogel added with 2% of the WHSP has a small and uniform pore size, indicating that the apparent morphology of the hydrogel is affected by the added amount of the WHSP, thereby further affecting use of the hydrogel.

3.5. Texture Profile Analysis of Hydrogels

Table 1 shows texture profile analysis of hydrogels. As can be seen from the table, introduction of the WHSP has no obvious influence on the texture of magnetic hydrogels.

TABLE 1

Texture profile analysis data of hydrogels

| Sample name | m-PVA/ CMC | m-PVA/CMC/ WHSP-2% | m-PVA/CMC/ WHSP-4 | m-PVA/CMC/ WHSP-8% |
|---|---|---|---|---|
| Hardness | 32.61 ± 3.84a | 33.06 ± 5.91a | 31.75 ± 0.19a | 29.74 ± 1.42a |
| Springiness | 0.72 ± 0.02a | 0.75 ± 0.07a | 0.72 ± 0.02a | 0.72 ± 0.01a |
| Chewiness | 24.34 ± 2.83a | 25.47 ± 7.46a | 23.63 ± 1.18a | 22.14 ± 0.88a |
| Cohesiveness | 1.03 ± 0.03a | 1.02 ± 0.07a | 1.04 ± 0.04a | 1.04 ± 0.06a |
| Fracturability | 32.61 ± 3.84a | 33.06 ± 5.91a | 31.75 ± 0.19a | 29.74 ± 1.42a |
| Gumminess | 33.7 ± 3.74a | 33.87 ± 7.12a | 32.99 ± 1.35a | 30.95 ± 1.6a |
| Resilience | 0.22 ± 0.02a | 0.22 ± 0.02a | 0.22 ± 0.02a | 0.23 ± 0.03a |

Each value in Table 1 is expressed as average value±standard deviation (SD). Values of different letter markers have statistical significance ($p<0.05$).

3.6. TG-DSC Analysis

Figure 7:
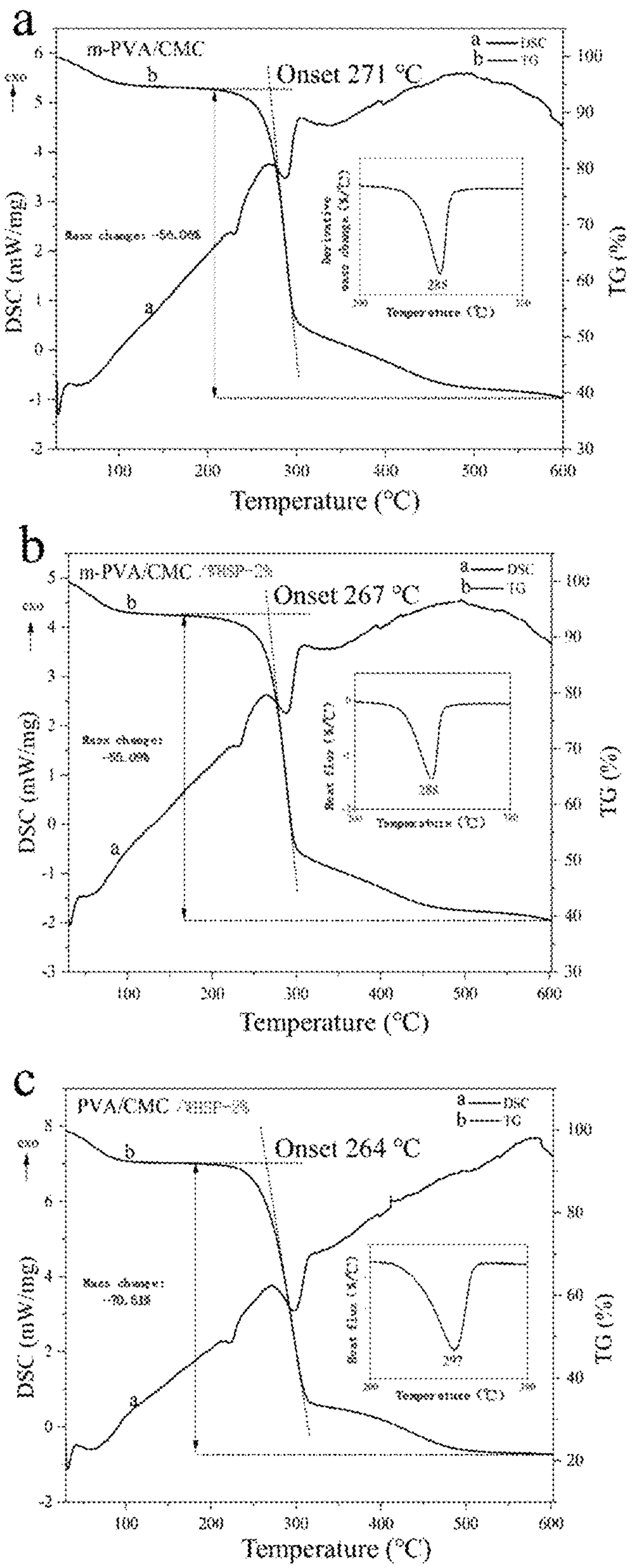
FIG. 7 shows thermogravimetry-differential scanning calorimetry (TG-DSC) analysis of hydrogels in an embodiment of the present application, in which a of FIG. 7 refers to m-PVA/CMC, b of FIG. 7 refers to m-PVA/CMC/WHSP-2%, and c of FIG. 7 refers to PVA/CMC/WHSP-2%.

Hydrogels including m-PVA/CMC/WHSP, m-PVA/CMC/WHSP-2% and PVA/CMC/WHSP-2% are analyzed and compared in thermal stability by TG, DTG and DSC curves, and results are shown in FIG. 7. According to the thermogravimetry curve, degradation of a hydrogel can be roughly divided into three stages: weight loss in a first stage (below 100° C.) is mainly caused by evaporation loss of bound water and adsorption water in the hydrogel; and primary weight loss in a second stage (200-350° C.) and further weight loss in a third stage (350-450° C.) are caused by degradation of polymers. As for the TG curve, as shown in a of FIG. 7, the three hydrogels has an initial decomposition temperatures of 271° C., 267° C. and 264° C., respectively, indicating that introduction of the WHSP and the $Fe_3O_4$ has no obvious influence on the initial decomposition temperature of the hydrogels. However, the hydrogels have heat absorption peaks in the DSC curve at about 50° C., which correspond to weight loss in the first stage in the TG curve. As the temperature is further increased to be greater than 200° C., it is observed that the hydrogels including m-PVA/CMC/WHSP-2%, PVA/CMC/WHSP-2% and PVA/CMC have main peaks in curves at 288° C., 288° C. and 297° C., respectively, which are consistent with main peaks in the DTG curve, indicating that decomposition of the hydrogels in the second stage is accelerated by introduction of $Fe_3O_4$. The phenomenon may be caused by thermal decomposition of the hydrogels based on catalytic properties of metal oxide nanoparticles. After being heated to 600° C., the m-PVA/CMC, the m-PVA/CMC/WHSP-2% and the PVA/CMC/WHSP-2% have a weight loss of 56.05%, 55.09% and 70.61%, respectively. Compared with the PVA/CMC/WHSP, the m-PVA/CMC and the m-PVA/CMC/WHSP-2% have lower weight loss due to residual $Fe_3O_4$.

4. Performance Tests

4.1. Swelling Property of Hydrogels

Figure 8:
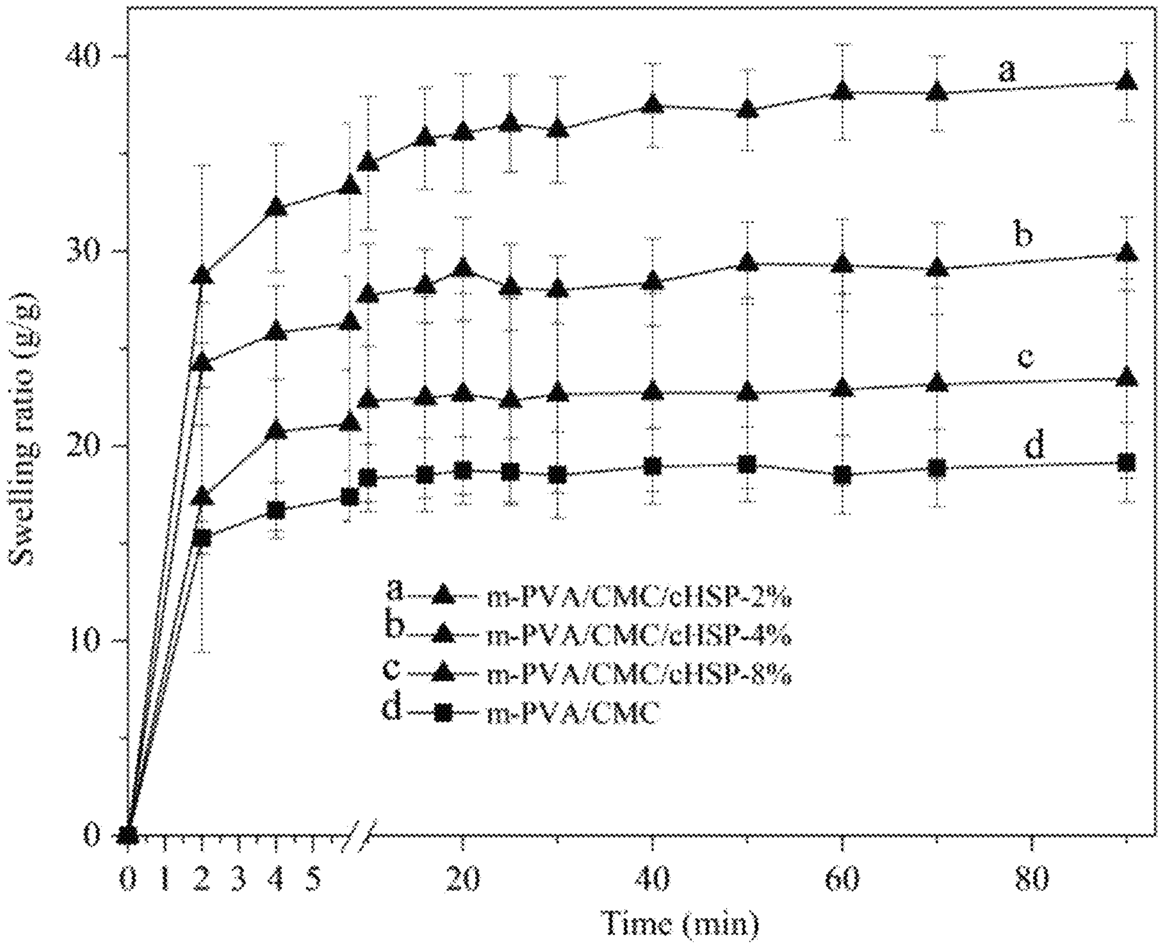
FIG. 8 shows swelling kinetic curves of hydrogels in distilled water in an embodiment of the present application.

FIG. 8 shows swelling conditions of magnetic hydrogels including m-PVA/CMC, m-PVA/CMC/WHSP-2%, m-PVA/

CMC/WHSP-4% and m-PVA/CMC/WHSP-8% in distilled water. The hydrogel added with 2% of crude sugar has an optimal swelling property and a swelling equilibrium water absorption amount of 38.67 mg/g, which is higher than an equilibrium water absorption amount (33.38 mg/g) of a magnetic nanocellulose hydrogel prepared by Dai et al. All the hydrogels reach swelling equilibrium after 16 min. Compared with the magnetic nanocellulose hydrogel prepared by Dai et al. that reaches swelling equilibrium in 90 min, the magnetic polysaccharide hydrogels have a short-term adsorption property.

4.2. pH Sensitivity Analysis of Hydrogels

Figure 9:
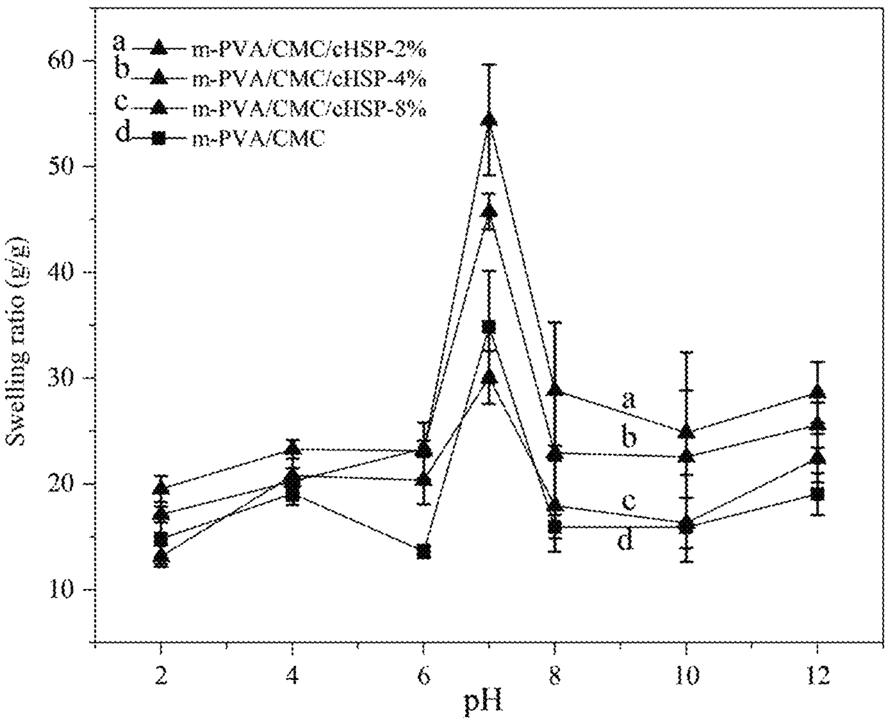
FIG. 9 shows swelling kinetic curves of hydrogels in aqueous solutions with different pH values in an embodiment of the present application.

In order to analyze the pH sensitivity of hydrogels, the hydrogels were immersed in solutions with a pH value of 2.0-12.0, respectively to test an equilibrium swelling ratio. Results are shown in FIG. 9. With changes of the pH value, all the hydrogels have a similar swelling trend, and the swelling ratio of the hydrogels is changed according to changes of the pH value of the solutions, showing obvious pH sensitivity. When the pH value of the solutions is increased from 2.0 to 7.0, the swelling ratio of the hydrogels is obviously increased, the hydrogels have a maximum equilibrium swelling ratio at a pH value of 7.0, and then the swelling ratio is decreased. Reasons for pH sensitive behaviors during swelling of the hydrogels are as follows. In acidic media (usually at a pH value of less than 4), most of —COO— groups in the hydrogels are protonated into —COOH groups, then the interaction between hydrogen bonds of the —COOH groups is strengthened, and electrostatic repulsion between the original —COO— groups is suppressed, so that diffusion of water molecules in network structures of the hydrogels is damaged, and accordingly, less swelling at a lower pH value is caused. With increase of the pH value of an external solution, —COOH is ionized into COO—, and the interaction between the hydrogen bonds is broken. In addition, the electrostatic repulsion between the —COO— groups is correspondingly enhanced, resulting in an increased swelling ratio of the hydrogels. However, under alkaline conditions, a charge shielding effect of $Na^+$ in a swelling medium can effectively prevent anion-anion electrostatic repulsion, resulting in decrease of the swelling ratio. Due to the above reasons, the swelling ratio of the hydrogels is decreased at a high pH value.

4.3. Analysis of an Adsorption Property of Hydrogels for Methylene Blue

4.3.1. Influence of the pH Value on the Adsorption Property

Figure 10:
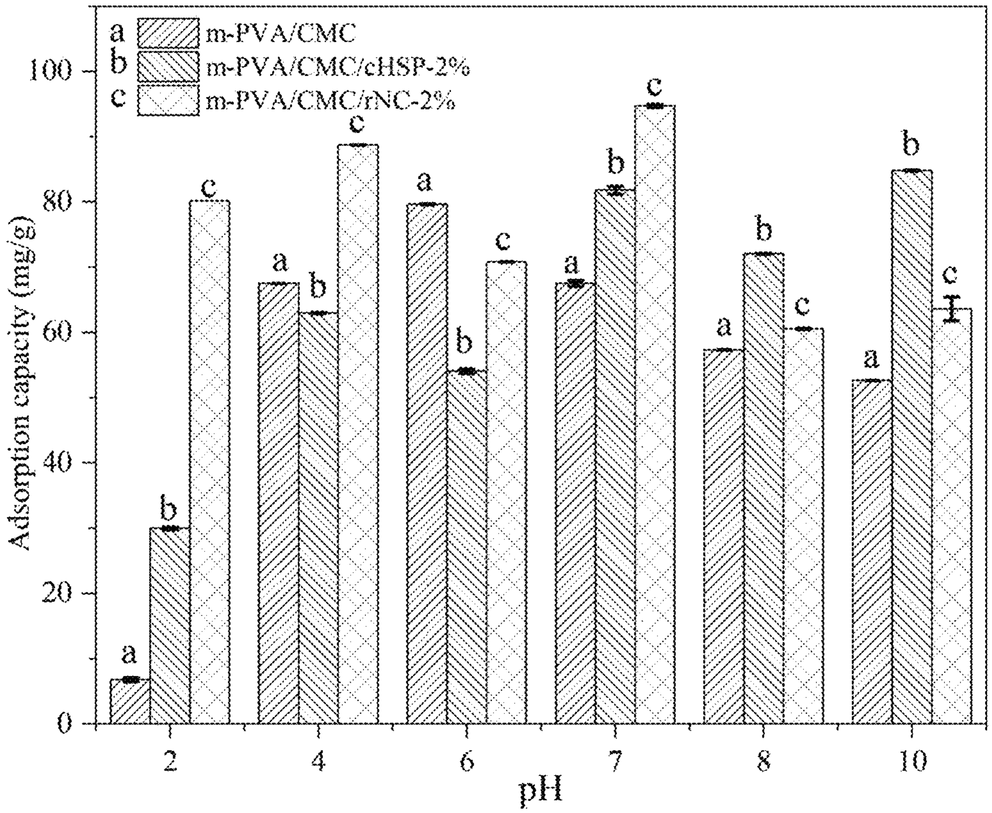
FIG. 10 shows influence of the pH value on an adsorption property of hydrogels in an embodiment of the present application.
Figure 11:
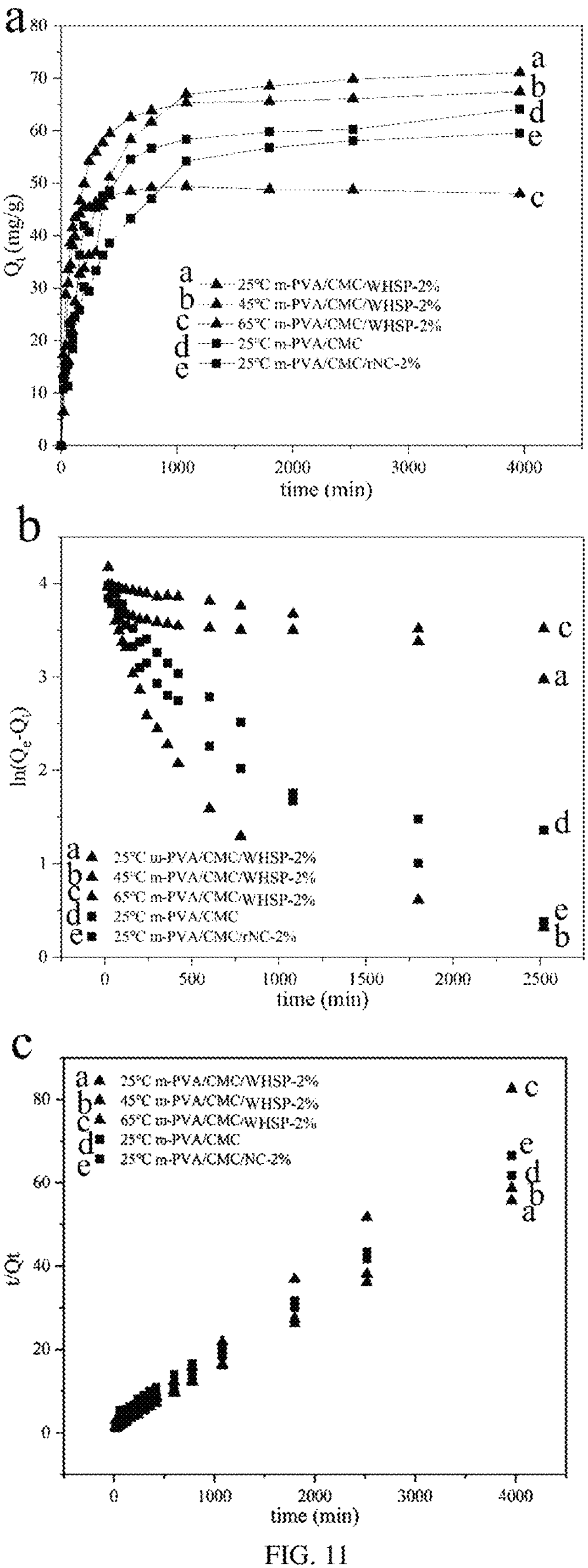
FIG. 11 shows kinetic analysis of a hydrogel added with 2% of WHSP for absorbing methylene blue at different temperatures in an embodiment of the present application, in which a of FIG. 11 shows kinetics, b of FIG. 11 shows pseudo-first order kinetic models, and c of FIG. 11 shows pseudo-second order kinetic models.
Figure 12:
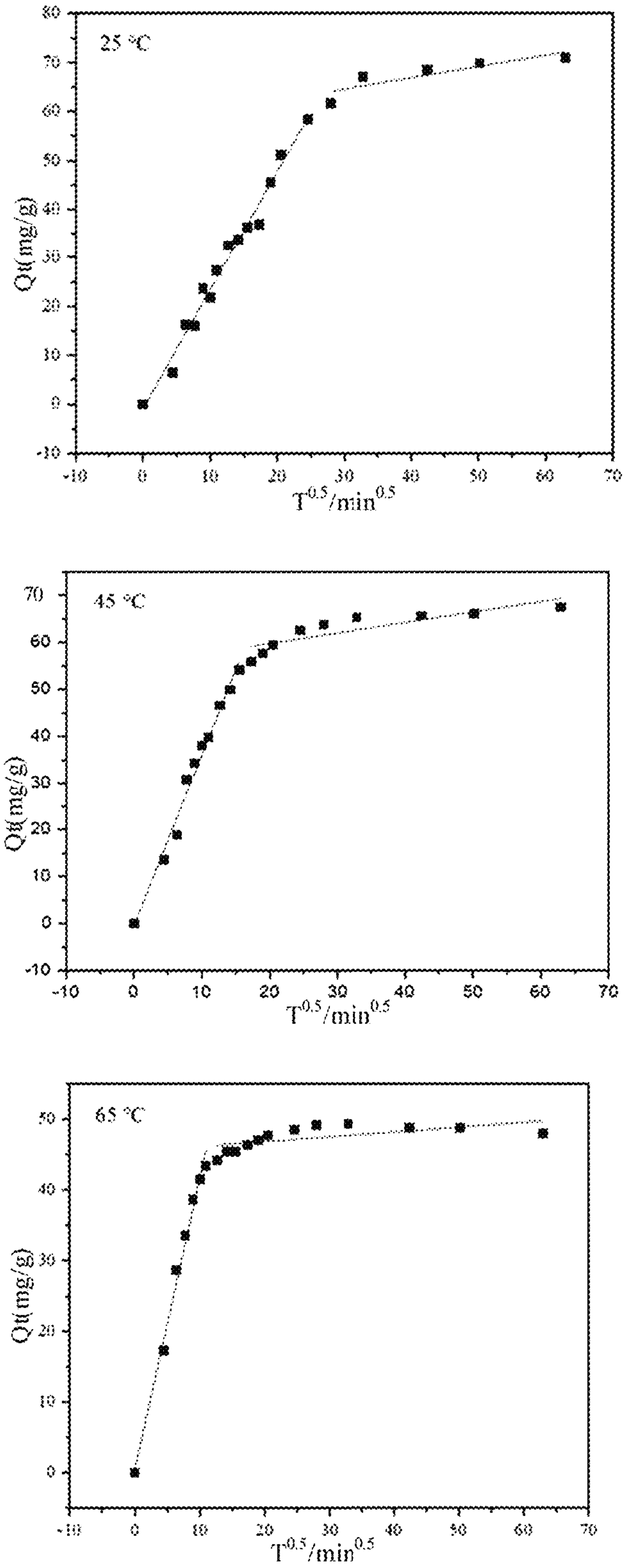
FIG. 12 shows fitting curves of particle internal diffusion models of a hydrogel m-PVA/CMC/WHSP-2% using a Weber equation in an embodiment of the present application.
Figure 13:
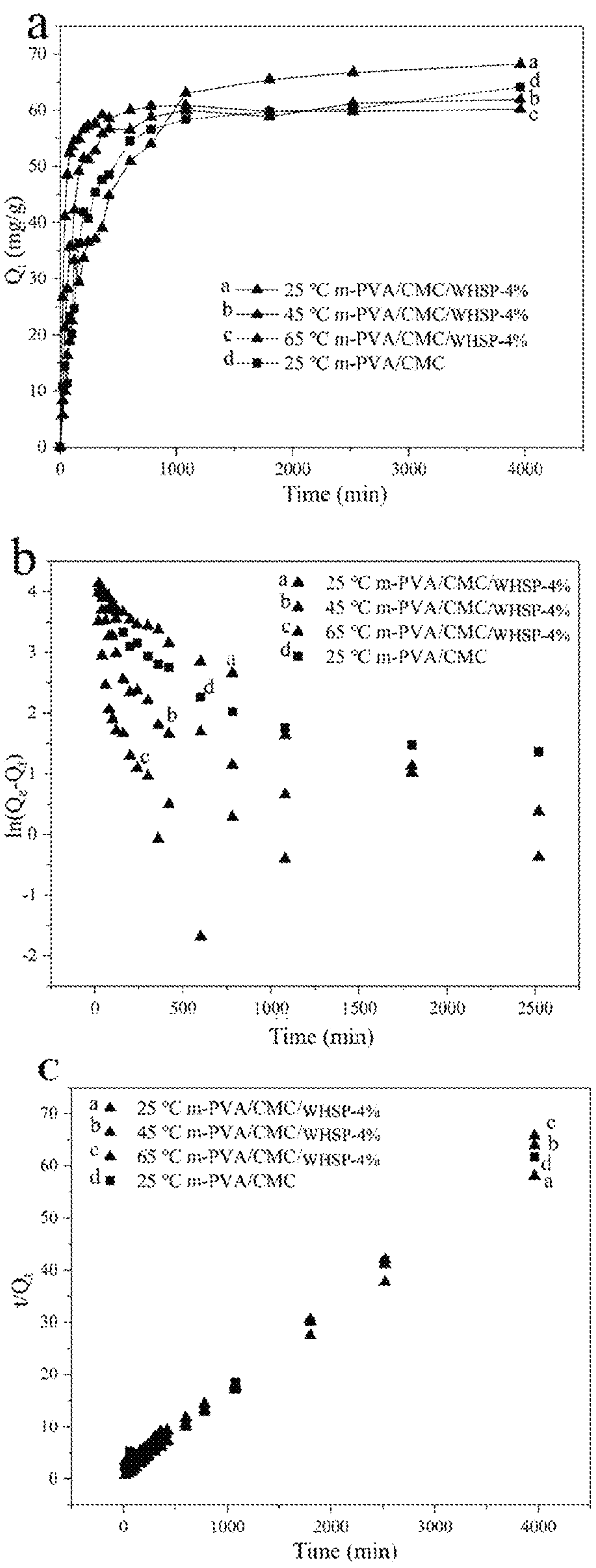
FIG. 13 shows kinetic analysis of a hydrogel added with 4% of WHSP for absorbing methylene blue at different temperatures in an embodiment of the present application, in which a of FIG. 13 shows kinetics, b of FIG. 13 shows pseudo-first order kinetic models, and c of FIG. 13 shows pseudo-second order kinetic models.
Figure 14:
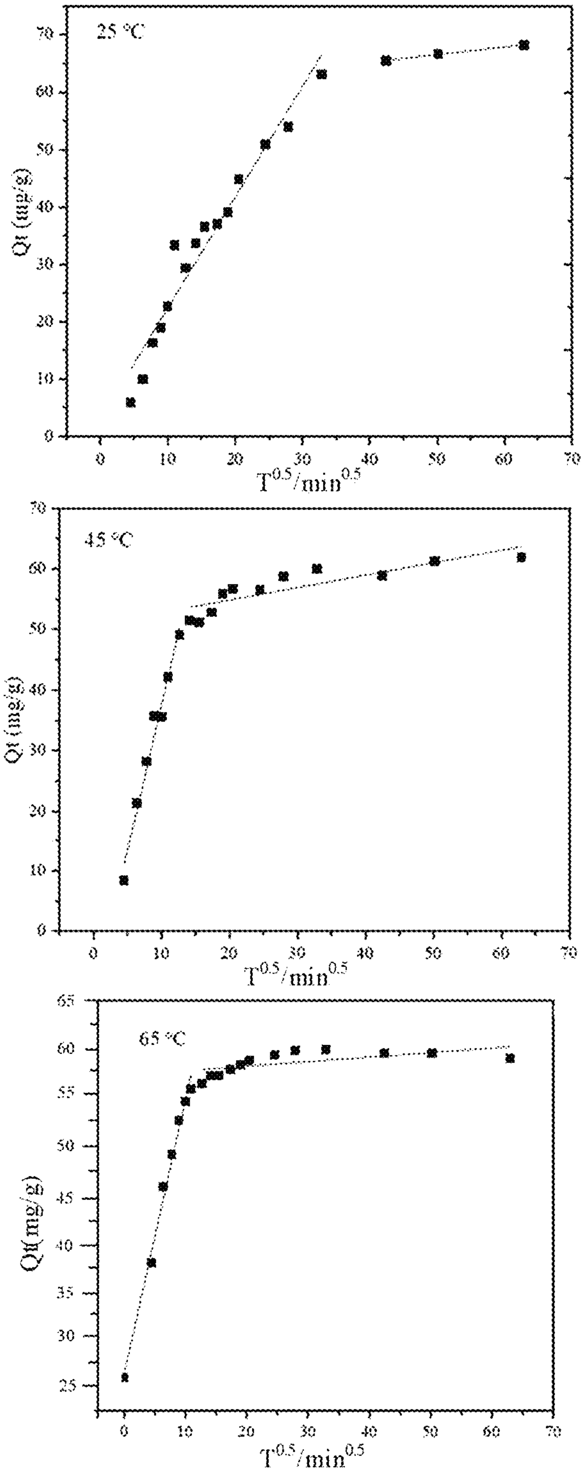
FIG. 14 shows fitting curves of particle internal diffusion models of a hydrogel m-PVA/CMC/WHSP-4% using a Weber equation in an embodiment of the present application.
Figure 15:
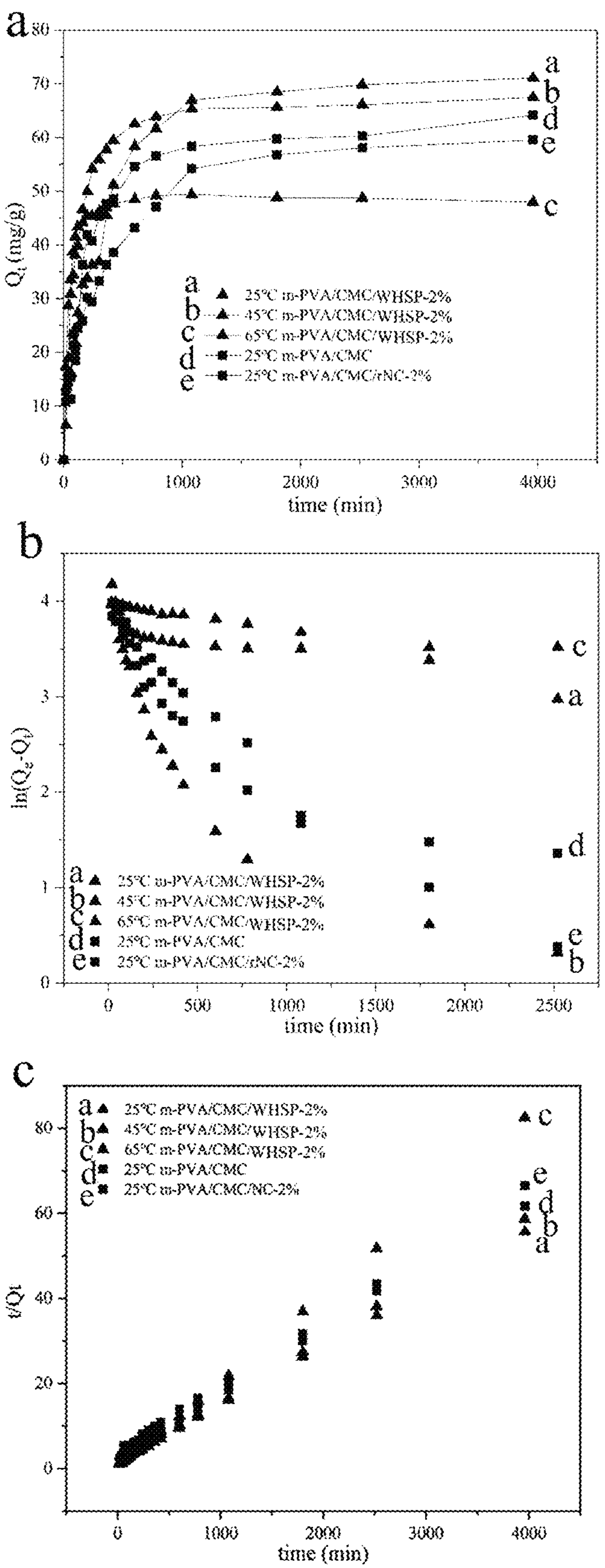
FIG. 15 shows kinetic analysis of a hydrogel added with 8% of WHSP for absorbing methylene blue at different temperatures in an embodiment of the present application, in which a of FIG. 15 shows kinetics, b of FIG. 15 shows pseudo-first order kinetic models, and c of FIG. 15 shows pseudo-second order kinetic models.
Figure 16:
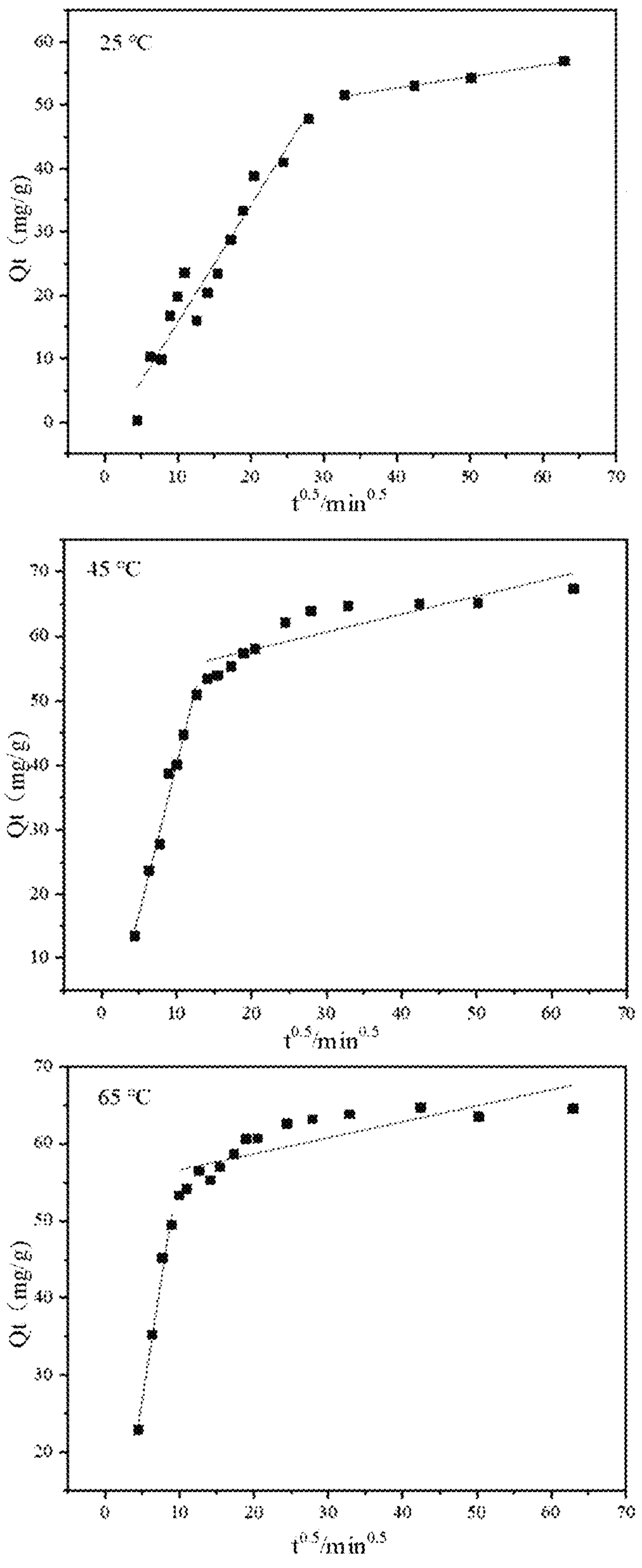
FIG. 16 shows fitting curves of particle internal diffusion models of a hydrogel m-PVA/CMC/WHSP-8% using a Weber equation in an embodiment of the present application.

The pH value of a solution is an important factor affecting an adsorption property of adsorption materials for a cationic dye, namely, methylene blue, which can affect the adsorption property by affecting the surface charge and dissociation of functional groups at active sites of the adsorption materials. An adsorption experiment was carried out to investigate the influence of polysaccharide hydrogels on the methylene blue removal rate in an aqueous solution at different pH values (2-10). Other experimental conditions were set as follows: adsorption was carried out in a dye solution with an initial concentration of 100 mg/L at normal temperature for 1 hour. Results are shown in a figure. As shown in FIG. 10, the hydrogels without addition of NC and WHSP have a methylene blue removal rate of 80% under weakly acidic conditions (with a pH value of 6). The hydrogel added with 2% of NC has a good methylene blue removal rate under neutral and acidic conditions, and can remove 95% of methylene blue at most under neutral conditions. The hydrogel added with 2% of WHSP has a strong adsorption ability for methylene blue in a neutral alkaline environment, and has a methylene blue removal rate of 85% under alkaline conditions. Therefore, a suitable modifier can be selected according to needs.

4.3.2. Adsorption Kinetics of Hydrogels at Different Temperatures

Fitting curves of pseudo-first order kinetic models, pseudo-second order kinetic models and particle internal diffusion Weber models of hydrogels including m-PVA/CMC, m-PVA/CMC/WHSP-2%, m-PVA/CMC/WHSP-4%, m-PVA/CMC/WHSP-8% and m-PVA/CMC/NC-2% for adsorbing methylene blue at different temperatures (25° C., 45° C. and 65° C.) are shown in FIG. 11 to FIG. 16. All the hydrogels have a high methylene blue adsorption rate in an initial adsorption stage (20-240 min), and the adsorption capacity is increased rapidly and then gradually decreased to equilibrium. As a methylene blue solution has high concentration in the initial adsorption stage and the hydrogels have a large number of free adsorption sites, the adsorption rate is high, and the adsorption capacity is rapidly increased. However, with prolonging of the adsorption time, the concentration of the methylene blue solution and the corresponding adsorption sites in the hydrogels are decreased, so that the adsorption capacity is slowly increased. The time for the hydrogels to reach adsorption equilibrium at 25° C., 45° C. and 65° C. is sequentially shortened. Taking m-PVA/CMC/WHSP-2% as an example, the time for reaching adsorption equilibrium is 1,800 min, 1,080 min and 780 min, respectively. In addition, the hydrogels added with 2% of WHSP and 4% of WHSP have a highest equilibrium adsorption capacity of 71.07 mg/g and 68.21 mg/g at a low temperature of 25° C., respectively. The hydrogel added with 8% of WHSP has a highest equilibrium adsorption capacity of 67.32 mg/g at 45° C. The hydrogel added with 4% of WHSP has relatively stable adsorption for methylene blue at an adsorption capacity of greater than 60 mg/g in a wide temperature range of 25-65° C. The hydrogel added with 2% of WHSP is more suitable for adsorption at medium and low temperatures. The hydrogel added with 8% of WHSP is more suitable for adsorption at high temperature. The added amount of WHSP and the temperature are important factors affecting the adsorption property of hydrogels, and may have an antagonistic effect.

Dynamic parameters of two models were obtained by linear regression fitting, and results are shown in Tables 2-7. A correlation coefficient ($R^2$>0.99) of a pseudo-second order kinetic model is higher than that (<0.97) of a pseudo-first order kinetic model. Meanwhile, a theoretical equilibrium adsorption capacity (Qe, cal) obtained by fitting of the pseudo-second order kinetic model is more similar to an experimental equilibrium adsorption capacity (Qe, exp). Therefore, a static adsorption process of methylene blue by the prepared hydrogels is more consistent with the pseudo-second order kinetic model. These results indicate that the adsorption process of the methylene blue by the prepared hydrogels is mainly controlled by a chemical adsorption process of exchanging or sharing electrons between dye cations and functional groups of the hydrogels. In addition, a rate constant ($K_2$) of the pseudo-second order kinetic model is increased with increase of the temperature, indicating that with increase of the adsorption temperature, the hydrogels have a higher methylene blue adsorption rate and reach adsorption equilibrium faster, which are consistent with a of FIG. 15. A hydrogel prepared from pineapple peel residue cellulose and PVA by Dai et al. has the problem that adsorption of methylene blue by the hydrogel is reduced at high temperature (50° C.) when the methylene blue is adsorbed. The reason may be that as the mobility of dye ions is increased at high temperature in the adsorption process, some dye molecules adsorbed onto the surface of the hydrogel are desorbed, and finally, the adsorption capacity is reduced. On the contrary, the m-PVA/CMC/WHSP-8% has a higher equilibrium adsorption capacity at a high temperature of 45° C. and 65° C. The reason may be that as the content of WHSP is increased, a hydroxyl group on molecular chains is increased, and active sites on the hydrogel may shield each other under the interaction between molecules, so that the hydrogel m-PVA/CMC/WHSP-8% has a low adsorption capacity at 25° C. With increase of the temperature, the chains are gradually opened, and the active sites are correspondingly increased, so that the hydrogel has a better adsorption capacity at 45° C. and 65° C. Therefore, hydrogels with a better adsorption capacity for methylene blue can be obtained by controlling the added amount of WHSP at different temperatures. A Weber-Morris internal diffusion equation, such as a fitting curve, is divided into two parts, which is not a straight line without passing through a coordinate origin, indicating that internal diffusion is not the only step of limiting the adsorption rate during adsorption of methylene blue by polysaccharide hydrogels. With increase of the temperature, the $K_1$ value is increased, indicating that an adsorbate is likely to be diffused in an adsorbent with increase of the temperature. At the same temperature, a better fitting effect is achieved by using a Weber equation in a first period of time, indicating that an earlier adsorption process has a particle internal diffusion adsorption mechanism. With increase of the temperature, the I value is increased, indicating that the influence of a liquid phase boundary layer around an adsorbent on a surface diffusion process of an adsorbent is increased with increase of the temperature

TABLE 2

Equation fitting results of pseudo-first order kinetics and pseudo-second order kinetics of a hydrogel m-PVA/CMC/WHSP-2%

| | | Pseudo-first order kinetic model | | | Pseudo-second order kinetic model | | |
|---|---|---|---|---|---|---|---|
| Hydrogel | Qe, exp | $R^2$ | Qe, cal (mg/g) | $K_1$ (mg/gmin−1) | $R^2$ | Qe, cal (mg/g) | $K_2$ (mg/gmin−1) |
| 25° C. m-PVA/CMC/WHSP-2% | 71.07 | 0.9761 | 54.407 | $9.21 \times 10^{-4}$ | 0.9983 | 75.76 | $6.22 \times 10^{-5}$ |
| 45° C. m-PVA/CMC/WHSP-2% | 67.48 | 0.7769 | 25.16 | $3.45 \times 10^{-3}$ | 0.9998 | 68.49 | $1.96 \times 10^{-4}$ |
| 65° C. m-PVA/CMC/WHSP-2% | 47.98 | 0.2865 | 42.35 | $2.30 \times 10^{-4}$ | 0.9997 | 48.54 | $1.62 \times 10^{-3}$ |
| 25° C. m-PVA/CMC | 64.15 | 0.7791 | 34.09 | $2.53 \times 10^{-3}$ | 0.9977 | 66.23 | $9.43 \times 10^{-5}$ |
| 25° C. m-PVA/CMC/NC-2% | 59.54 | 0.9734 | 41.72 | $3.45 \times 10^{-3}$ | 0.9973 | 62.5 | $7.72 \times 10^{-5}$ |

TABLE 3

Weber equation fitting results of particle internal diffusion models of a hydrogel m-PVA/CMC/WHSP-2%

| | 1st stage | | | | 2nd stage | | | |
|---|---|---|---|---|---|---|---|---|
| Hydrogel | Time | $K_1$ | I | $R^2$ | Time | $K_2$ | I | $R^2$ |
| 25° C. m-PVA/CMC/WHSP-2% | 20-600 | 2.434 | −0.878 | 0.982 | 780-3960 | 0.231 | 57.62 | 0.782 |
| 45° C. m-PVA/CMC/WHSP-2% | 20-240 | 3.645 | −0.437 | 0.983 | 300-3960 | 0.222 | 55.31 | 0.741 |
| 65° C. m-PVA/CMC/WHSP-2% | 20-120 | 4.123 | 0.506 | 0.989 | 160-3960 | 0.068 | 45.454 | 0.402 |
| 25° C. m-PVA/CMC | 20-600 | 2.655 | −2.031 | 0.947 | 780-3960 | 0.219 | 50.156 | 0.944 |
| 25° C. m-PVA/CMC/NC-2% | 20-600 | 1.719 | 3.493 | 0.974 | 780-3960 | 0.306 | 41.916 | 0.759 |

TABLE 4

Equation fitting results of pseudo-first order kinetics and pseudo-second order kinetics of a hydrogel m-PVA/CMC/WHSP-4%

| | | Pseudo-first order kinetic model | | | Pseudo-second order kinetic model | | |
|---|---|---|---|---|---|---|---|
| Hydrogel | Qe, exp | $R^2$ | Qe, cal (mg/g) | $K_1$ (mg/gmin−1) | $R^2$ | Qe, cal (mg/g) | $K_2$ (mg/gmin−1) |
| 25° C. m-PVA/CMC/WHSP-4% | 68.2109 | 0.9617 | 49.4519 | $3.45 \times 10^{-3}$ | 0.9985 | 72.4638 | $4.882 \times 10^{-5}$ |
| 45° C. m-PVA/CMC/WHSP-4% | 61.9405 | 0.7463 | 20.0775 | $3.45 \times 10^{-3}$ | 0.9995 | 62.8931 | $2.43 \times 10^{-4}$ |
| 65° C. m-PVA/CMC/WHSP-4% | 60.2074 | 0.9264 | 19.5329 | $1.73 \times 10^{-2}$ | 0.9999 | 60.241 | $1.38 \times 10^{-3}$ |
| 25° C. m-PVA/CMC | 64.15 | 0.7791 | 34.09 | $2.53 \times 10^{-3}$ | 0.9977 | 66.23 | $9.43 \times 10^{-5}$ |

TABLE 5

Weber equation fitting results of particle internal diffusion models of a hydrogel m-PVA/CMC/WHSP-4%

| Hydrogel | 1st stage Time | $K_1$ | I | $R^2$ | 2nd stage Time | $K_2$ | I | $R^2$ |
|---|---|---|---|---|---|---|---|---|
| 25° C. m-PVA/CMC/WHSP-4% | 20-108 | 1.932 | 3.052 | 0.9456 | 1800-3960 | 0.133 | 59.823 | 0.9888 |
| 45° C. m-PVA/CMC/WHSP-4% | 20-160 | 4.805 | −10.444 | 0.9762 | 200-3960 | 0.205 | 50.746 | 0.7559 |
| 65° C. m-PVA/CMC/WHSP-4% | 20-100 | 4.895 | 7.73 | 0.9318 | 120-3960 | 0.076 | 56.646 | 0.4267 |
| 25° C. m-PVA/CMC | 20-600 | 2.655 | −2.031 | 0.947 | 780-3960 | 0.219 | 50.156 | 0.944 |

TABLE 6

Equation fitting results of pseudo-first order kinetics and pseudo-second order kinetics of a hydrogel m-PVA/CMC/WHSP-8%

| Hydrogel | Qe, exp | Pseudo-first order kinetic model $R^2$ | Qe, cal (mg/g) | $K_1$ (mg/gmin−1) | Pseudo-second order kinetic model $R^2$ | Qe, cal (mg/g) | $K_2$ (mg/gmin−1) |
|---|---|---|---|---|---|---|---|
| 25° C. m-PVA/CMC/WHSP-8% | 56.934 | 0.9057 | 41.2232 | $2.99 \times 10^{-3}$ | 0.9947 | 60.98 | $5.79 \times 10^{-5}$ |
| 45° C. m-PVA/CMC/WHSP-8% | 67.32 | 0.7177 | 22.78 | $2.99 \times 10^{-3}$ | 0.9998 | 68.03 | $2.17 \times 10^{-4}$ |
| 65° C. m-PVA/CMC/WHSP-8% | 64.55 | 0.9118 | 20.2 | $8.06 \times 10^{-3}$ | 0.9999 | 64.94 | $5.63 \times 10^{-4}$ |
| 25° C. m-PVA/CMC | 64.15 | 0.7791 | 34.09 | $2.53 \times 10^{-3}$ | 0.9977 | 66.23 | $9.43 \times 10^{-5}$ |

TABLE 7

Weber equation fitting results of particle internal diffusion models of a hydrogel m-PVA/CMC/WHSP-8%

| Hydrogel | 1st stage Time | $K_1$ | I | $R^2$ | 2nd stage Time | $K_2$ | I | $R^2$ |
|---|---|---|---|---|---|---|---|---|
| 25° C. m-PVA/CMC/WHSP-8% | 20-780 | 1.848 | −2.801 | 0.935 | 1080-3960 | 0.179 | 45.538 | 0.9933 |
| 45° C. m-PVA/CMC/WHSP-8% | 20-160 | 4.637 | −6.334 | 0.9815 | 200-3960 | 0.278 | 52.318 | 0.7641 |
| 65° C. m-PVA/CMC/WHSP-8% | 20-80 | 6.103 | −3.723 | 0.9878 | 100-3960 | −3.723 | 54.541 | 0.6773 |
| 25° C. m-PVA/CMC | 20-600 | 02.655 | −2.031 | 0.947 | 780-3960 | 0.219 | 50.156 | 0.944 |

Various technical features in the above examples can be combined in any manner. For the purpose of concise description, all possible combinations of the technical features in the examples are not described. However, all the combinations of the technical features shall be considered as falling within the scope of the specification without contradiction.

The above examples are specifically described for expressing only several embodiments of the present application in detail, but are not construed as limitations on the scope of the patent application. It is to be noted that for persons of ordinary skill in the art, various deformations and improvements can be made without deviating from the concept of the present application, and all the deformations and improvements fall within the scope of protection of the present application. Therefore, the scope of protection of the patent application shall be defined by the attached claims.

What is claimed is:

1. A hydrogel, comprising polyvinyl alcohol, sodium carboxymethyl cellulose and Huangshui polysaccharide, wherein a mass ratio of a mass sum of the polyvinyl alcohol and the sodium carboxymethyl cellulose to the Huangshui polysaccharide is 100:(1.8-8.2), and an extraction step of the Huangshui polysaccharide comprises: sequentially subjecting brewing Huangshui to centrifugation, ultrafiltration, alcohol precipitation treatment and centrifugation, collecting a precipitate, and drying the precipitate.

2. The hydrogel according to claim 1, wherein the mass ratio of the mass sum of the polyvinyl alcohol and the sodium carboxymethyl cellulose to the Huangshui polysaccharide is 100:(1.8-2.2).

3. The hydrogel according to claim 1, wherein a mass ratio of the polyvinyl alcohol to the sodium carboxymethyl cellulose is (2.8-3.2):(1.8-2.2).

4. The hydrogel according to claim 1, wherein the polyvinyl alcohol, the sodium carboxymethyl cellulose and the Huangshui polysaccharide are connected by at least one of intermolecular hydrogen bonds or intramolecular hydrogen bonds, and the hydrogel has a porous structure.

5. The hydrogel according to claim 1, wherein the hydrogel further comprises magnetic particles doped in a hydrogel matrix.

6. The hydrogel according to claim 1, wherein the hydrogel is used as an adsorbent for a dye.

7. The hydrogel according to claim 6, wherein the dye is methylene blue.

8. The hydrogel according to claim 6, wherein the hydrogel as the adsorbent for the dye has an operating pH value of 2-10 and an operating temperature of 25-65° C.

9. A method for preparing the hydrogel according to claim 1, comprising the following steps:

a, swelling the polyvinyl alcohol in water to obtain a swelled polyvinyl alcohol solution;

b, mixing the swelled polyvinyl alcohol solution with the sodium carboxymethyl cellulose to obtain a first mixture, and heating and stirring the first mixture to obtain a heated and stirred first mixture;

c, cooling the heated and stirred first mixture to obtain a cooled first mixture;

d, mixing the cooled first mixture with the Huangshui polysaccharide to obtain a second mixture; and e, subjecting the second mixture to freezing and thawing in cycles.

10. The method for preparing the hydrogel according to claim 9, wherein the method comprises at least one of the following features (1)-(5):

(1) a swelling process in the step a comprises steps of heating and stirring, the heating is performed at a temperature of 55-65° C., and the stirring is performed for 30-60 min;

(2) in the step b, the heating is performed at a temperature of 88-98° C., and the stirring is performed for 50-70 min;

(3) the cooling in the step c is performed to a temperature of 20-30° C.;

(4) the step of mixing in the step d comprises dropping a Huangshui polysaccharide solution into the first mixture; and (5) in the step e, the freezing is performed at a temperature of −20° C. to −15° C., the thawing is performed at a temperature of 25-30° C., the freezing is performed for 7-9 h each time, the thawing is performed for 4-6 h each time, and the freezing and the thawing are performed in 5-8 cycles.

11. The method for preparing the hydrogel according to claim 10, wherein in the extraction step, conditions for a first centrifugation comprise that the first centrifugation is performed at a temperature of 0-4° C. and a centrifugal force of 4,000-6,000 g for 15-30 min, and conditions for second and subsequent centrifugations comprise that the second and subsequent centrifugations is performed at a temperature of 0-4° C. and a centrifugal force of 8,000-10,000 g for 5-25 min.

12. The method for preparing the hydrogel according to claim 9, wherein the step c further comprises a step of stirring after the cooling, and the stirring is performed for 20-40 min.

13. The method for preparing the hydrogel according to claim 9, wherein the step d further comprises a step of stirring the second mixture, and the stirring is performed for 20-40 min.

14. The method for preparing the hydrogel according to claim 9, wherein the method further comprises sequentially immersing a gel product obtained in the step e in a first solution added with iron ions, and then immersing the gel product in a second solution added with hydroxide ions to carry out a reaction; optionally, the iron ions are a mixture of $Fe^{2+}$ and $Fe^{3+}$, a concentration ratio of the $Fe^{2+}$ to the $Fe^{3+}$ is (0.8-1.2):2, an immersing time during which the gel product is immersed in the first solution is 3-5 h, a concentration of the hydroxide ions is 1.8-2.2 mol/L, and an immersing time during which the gel product is immersed in the second solution is 3-5 h;

and optionally, the method further comprises a step of washing a reaction product to neutral.

* * * * *